United States Patent [19]
Welsh et al.

[11] Patent Number: 5,635,816
[45] Date of Patent: Jun. 3, 1997

[54] METHOD AND APPARATUS FOR CONTROLLING BATTERY CHARGING CURRENT

[75] Inventors: Daniel Welsh, Solana Beach, Calif.; Kenneth F. Gerken, Brookeville, Md.

[73] Assignee: Morningstar Corporation, Olney, Md.

[21] Appl. No.: 509,743

[22] Filed: Aug. 1, 1995

[51] Int. Cl.$^6$ .......................... H01M 10/44; H01M 10/46
[52] U.S. Cl. ............................. 320/21; 320/61; 136/293
[58] Field of Search .................................... 320/61, 1, 2, 5, 320/21, 31, 39, 48; 323/906; 136/243, 291, 293

[56] References Cited

U.S. PATENT DOCUMENTS

| | | |
|---|---|---|
| 3,384,806 | 5/1968 | Hartman . |
| 3,531,706 | 9/1970 | Mullersman . |
| 3,600,599 | 8/1971 | Wright et al. . |
| 3,731,474 | 5/1973 | Tsuruishi . |
| 3,740,636 | 6/1973 | Hogrefe et al. . |
| 3,921,049 | 11/1975 | Mellors et al. . |
| 3,956,687 | 5/1976 | Lindenman . |
| 4,095,217 | 6/1978 | Tani et al. . |
| 4,143,282 | 3/1979 | Berard, Jr. et al. . |
| 4,173,733 | 11/1979 | Sugalski et al. . |
| 4,186,336 | 1/1980 | Weinberg et al. . |
| 4,207,511 | 6/1980 | Radtke . |
| 4,240,021 | 12/1980 | Kashima et al. . |
| 4,243,928 | 1/1981 | Nazimek . |
| 4,349,775 | 9/1982 | Kwon et al. . |
| 4,539,516 | 9/1985 | Thompson . |
| 4,571,532 | 2/1986 | Jaster . |
| 4,604,567 | 8/1986 | Chetty . |
| 4,626,764 | 12/1986 | Weinhardt . |
| 4,636,931 | 1/1987 | Takahashi et al. . |
| 4,661,758 | 4/1987 | Whittaker . |
| 4,794,272 | 12/1988 | Bavaro et al. . |
| 4,847,546 | 7/1989 | Bobier et al. . |
| 4,871,959 | 10/1989 | Gali . |

(List continued on next page.)

FOREIGN PATENT DOCUMENTS 2529906  1/1977  Germany .

OTHER PUBLICATIONS

"CC-20B Charge Controller", Heliotrope General, Aug./Sep. 1995, 3 pages.

Woodworth et al, "Evaluation of the Batteries and Charge Controllers in Small Stand-Alone Photovoltaic Systems", First World Conference on Photovoltaic Energy Conversion (WCPEC), Dec. 1994, pp. 1-13.

(List continued on next page.)

*Primary Examiner*—Edward Tso

[57] ABSTRACT

An automatic photovoltaic controller provides a fixed frequency, pulse width modulated charging current to charge and regulate a battery, the duty cycle of the charging current being controlled by the difference between the sensed battery voltage and a desired regulated voltage. Modulation is achieved by controlling the on and off states of plural parallel-connected FET switches placed in series between the photovoltaic array and the battery. The duty cycle is adjustable in discrete steps over the entire range of 0% to 100% and is updated numerous times per second with new battery voltage measurements to provide highly accurate regulation. The charge current pulse rise time is selected to match the response time of the photovoltaic array. The fixed frequency of the charge current is within the preferred range of 100 Hz to 600 Hz to provide sufficient time for the chemical reaction within the battery cells to be substantially completed between charge pulses during the regulation mode. Automatic protection of the controller and the load is achieved by rapidly disconnecting the battery and/or load in response to specified conditions. The photovoltaic array is disconnected from the battery at night to prevent battery discharge into the array. Equalization of the battery is performed automatically, at a voltage level slightly higher than the regulated voltage, after a predetermined number of days or if the battery voltage falls below a predetermined level.

33 Claims, 9 Drawing Sheets

U.S. PATENT DOCUMENTS

| | | |
|---|---|---|
| 4,873,480 | 10/1989 | Lafferty . |
| 5,027,051 | 6/1991 | Lafferty . |
| 5,041,952 | 8/1991 | Janda et al. . |
| 5,084,664 | 1/1992 | Gali . |
| 5,086,267 | 2/1992 | Janda et al. . |
| 5,153,497 | 10/1992 | Elden . |
| 5,164,654 | 11/1992 | Bertram et al. . |
| 5,196,781 | 3/1993 | Jamieson et al. . |
| 5,221,891 | 6/1993 | Janda et al. . |
| 5,270,636 | 12/1993 | Lafferty . |
| 5,276,393 | 1/1994 | Gali . |

OTHER PUBLICATIONS

Harrington et al, "Battery Charge Controller Characteristics in Photovoltaic Systems", 7th Annual Battery Conference on Applications and Advances, Jan. 1992, pp. 1–8.

Galdino et al, "An Intelligent Battery Charge Controller for Small Scale PV Systems", 12th European Photovoltaic Solar Energy Conference, Apr. 1994, pp. 452–454.

McCarthy, "Concerted Action on Battery Control and Management in PV Systems", 12th European European Photovoltaic Solar Energy Conference, Apr. 1994, pp. 473–475.

Pessas et al "A Reliable Photovoltaic Battery Charge Regulator with Ideal $V_B$; $I_B$; vs t Profile" 10th European Photovoltaic Solar Energy Conference, Apr. 1991, pp. 996–999.

Decker et al "Development and Evaluation of a 20 Watt MPP Tracking Charge Controller for PV Supplied Remote Monitoring Stations", 10th European Photovoltaic Solar Energy Conference, Apr. 1991, pp. 1004–1007.

Jossen et al, "Battery Control Unit with State of Charge Indicator", 10th European Photovoltaic Solar Energy Conference, Apr. 1991, pp. 1012–1015.

METHOD AND APPARATUS FOR CONTROLLING BATTERY CHARGING CURRENT

TECHNICAL FIELD

The present invention pertains to photovoltaic (PV) system controllers for battery operated systems. More particularly, the invention relates to an improved method and apparatus for charging and regulating the battery, extending the operational life of the battery and protecting both the controller and the system load against damage.

DISCUSSION OF THE PRIOR ART

There are numerous prior art systems utilizing PV arrays to charge batteries. Examples are found in U.S. Pat. Nos. 3,384,806 (Hartman), 4,661,758 (Whittaker) and 5,276,393 (Gali). The Hartman patent discloses a pulse width modulator (PWM) charging arrangement utilizing a series switch connected between the PV array and the battery. The switch is cycled on and off such that the ratio of the on and off times is controlled by the derivative of the output power with respect to the output current in an attempt to achieve maximum power transfer to the load. Whittaker, recognizing that the Hartman approach and others do not consider the state of charge of the battery when controlling charging current, discloses a PV charging system for a battery wherein the PV array is short circuited by a shunt switch during varying time intervals determined by the "charge condition" of the battery. Whittaker actually mis-uses the phrase "charge condition" since the disclosed system responds to the voltage across the battery terminals, not to the state of charge of the battery. As is well known, the state of charge of a battery may be judged from a reading of the battery terminal voltage only when the battery is at open circuit. Since the battery in Whittaker is driving a variable or indeterminate load, the discharge rate is not known. Whittaker, then, incorrectly characterizes what is occurring in his disclosed circuit. In any event, the battery voltage in the Whittaker circuit is compared to a temperature-corrected reference voltage to trigger a pulse width generator operating at a variable frequency. Specifically, during each operating cycle, the pulse width generator provides a pulse of fixed time duration T during which the PV array is shunted and no charging current flows to the battery. At the end of interval T the shunt path is opened to permit charging current to flow to the battery until the sensed battery voltage reaches the reference voltage level. At that time the pulse width generator is triggered and provides another fixed interval (T) pulse to reapply the shunt path across the PV array. The combined time period of fixed interval T pulse the battery voltage-dependent variable charge interval is, obviously, variable. Accordingly, the frequency of the shunt-charge cycle is variable. Whittaker does not specify the variable frequency range and does not specify the duration of the fixed interval T.

The Gali patent deals with another aspect of battery charging, namely avoidance of build-up of sulfate compound on the battery plates. Specifically, when a lead-acid battery discharges, the lead on the plate surfaces changes to lead sulfate that partially or entirely covers the plate surface. Low current charging cannot adequately remove the sulfate deposits that eventually crystallize and reduce battery capacity. Gali notes that conventional fast charging approaches at high charging voltages remove the sulfates but overheat and warp the battery plates. He goes on to describe how sufficiently fast rise time charging voltage pulses, which rise to voltage levels above the theoretical battery cell voltages, release the sulfates that build up on the plate surfaces so that much of the sulfates can return to the electrolyte solution. In order to provide the desired fast rise time pulses, Gali generates radio-frequency (RF) charging voltages in the frequency range of two to ten megahertz. These RF signals are provided in pulse envelopes having repetition rates in the range of 10 KHz to 100 KHz. The resulting circuit is complex, expensive and prone to applying noise to the load at the pulse envelope and RF frequencies as well as at modulation components of those frequencies.

There are other aspects of battery operation and structure that must also be considered when utilizing a PV system controller to charge and regulate the battery. For example, when the battery is at a very low state of charge while connected to a load, the battery can be irrevocably damaged. Further, if the charging current is permitted to exceed a predetermined level when the battery is fully charged, excessive bubbles of gas collect at the faces and in the pores of the plates, thereby increasing the contact resistance between the plates and the electrolyte. In addition, excessive gassing causes erosion of the active material in the plates.

Another important consideration is that efficiency demands that the battery be prevented from discharging back into the PV array at night or at other times when PV array output voltages fall below the battery voltage.

Still another battery characteristic that must be considered is the ability of the battery chemical reaction to respond to on-off charging current. If the frequency is too high, the inertial effects of the chemical reaction are such that the battery cannot respond efficiently. If the frequency is too low, the rise time of the charging current is not fast enough to achieve the desired removal of sulfate compounds from the plates.

Finally, it is known that battery life and operation benefit significantly from occasional equalization charges. Specifically, the selection of a voltage level at which to regulate the battery is typically a trade off between operation at a maximum possible voltage on the one hand and achieving full charge in the shortest possible time without gas formation and overheating on the other hand. When the battery is so undercharged as to have its terminal voltage drop below its optimal operating level ($V_r$), continued charging current will be accepted by the battery. When the battery voltage is held constant at the $V_r$ level it accepts less and less charging current, the accepted charge current falling off exponentially as a function of percent of charge. At the compromise regulation level, the chemical reactions within the battery cells are not fully completed and, as a consequence, sulfate crystals tend to build-up on the plates and increase the cell resistance. An "equalization" is merely a procedure whereby the battery is charged to a voltage level slightly higher than the normal regulated voltage in order to complete the chemical reactions and dissolve the sulfate crystals. Equalization is typically performed for some selected number of hours and is done manually in accordance with some written prescribed schedule, although for some installations it may be performed whenever it becomes convenient for personnel to do so. In remote unattended sites, or at sites where maintenance personnel are not regularly present, equalization is rarely performed. Accordingly, to date there has been no satisfactory automatic equalization procedure devised for PV system controllers.

OBJECTS AND SUMMARY OF THE INVENTION

It is a primary object of the present invention to provide a PV system controller, and a method of operation of such controller, whereby automatic charging and regulating of a battery is arranged to accommodate the natural charging and operating characteristics of the battery itself, thereby providing for optimal charging and regulation efficiency while extending the battery life.

It is another object of the present invention to provide a PV system controller for effecting optimal charging and regulation of the battery while automatically protecting the controller and system load against damage.

A further object of the invention is to provide an efficient method and apparatus for performing battery equalization with a PV system controller.

As part of the present invention it was discovered that pulse width modulated (PWM) battery charging current has optimal effect at a fixed frequency in the range of 100 Hz to 600 Hz, although practical efficient operation may also be achieved at frequencies as low as approximately 50 Hz and as high as approximately 1,000 Hz. At frequencies above this range the inherent time required to complete the chemical reaction in the cells is such as to preclude completion of the reaction between cycles. At lower frequencies the rise times of the charge pulses are not sufficiently fast to minimize gas bubble formation. The present invention employs a fixed mid-range frequency, typically 300 Hz, and modulates the duty cycle in response to sensed battery voltage measurements. The PWM signal is updated every n cycles of the 300 Hz signal based on the average of multiple periodic voltage measurements made during the previous n cycles. The duty cycle of the PWM signal is variable over a range between 0% (for the fully charged condition) to 100% (for low charge condition) and is changed in discrete steps. We have found that duty cycle increments on the order of 6 or 7%, and an update frequency on the order of every sixteen cycles of the PWM signal (i.e., n=16), result in highly efficient charging and regulation.

The PV system controller utilizes back-to-back field effect transistors (FETs) with limited gate drive for PWM switching to eliminate transients during connection and disconnection of the PV array to and from the battery. In addition, FET circuits are provided to respond to specific operating conditions in order to: (a) prevent battery discharge into the PV array; (b) protect the battery by disconnecting the load from the battery when the battery voltage is too low; and (c) protect the system by disconnecting the battery from the load and the PV array if the battery voltage becomes too high.

Battery equalization is effected automatically, either after a predetermined number of days (e.g., seventeen days) or if the battery is so deeply discharged as to fall to some very low voltage level. An equalization resulting from an undervoltage condition automatically resets the day count to prevent against invoking another equalization process before seventeen days have elapsed, unless, of course, another undervoltage condition occurs.

The above and still further objects, features and advantages of the present invention will become apparent upon consideration of the following detailed description of a specific embodiment thereof, particularly when taken in conjunction with the accompanying drawings wherein like reference numerals and the various figures are utilized to designate components.

DESCRIPTION OF THE PREFERRED EMBODIMENTS

Figure 1:
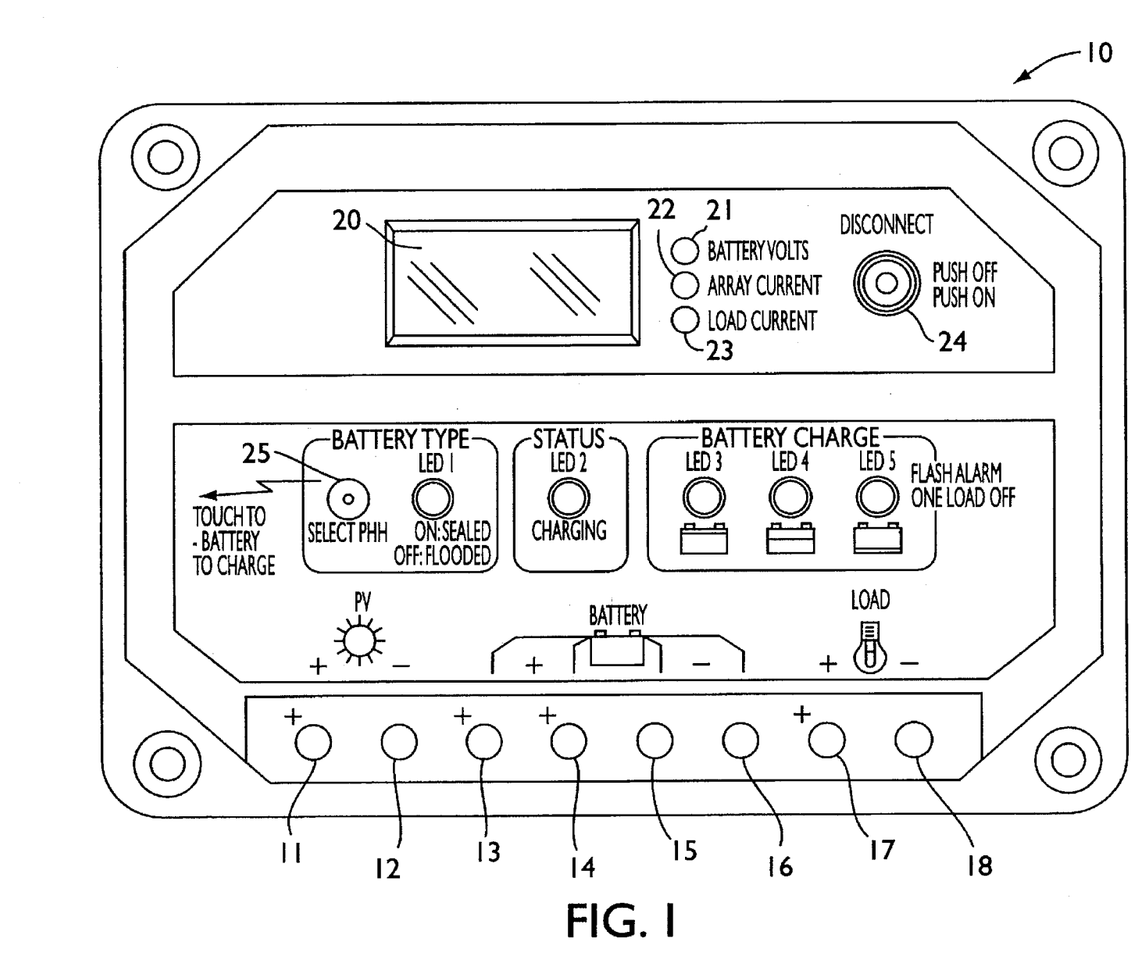
FIG. 1 is a plan view of the front panel of a PV system controller constructed in accordance with the present invention.

Referring to FIG. 1, a front panel 10 for a PV controller of the present invention includes positive and negative terminals 11 and 12 for connecting a PV array to the controller. The PV array is not shown but is a conventional array of photovoltaic cells capable of providing a current when exposed to sunlight. Additional terminals 14 and 15 are battery sensed terminals that are adapted for connection to the positive and negative terminals, respectively, of the system battery to permit measurement, at the controller, of the battery terminal voltage. Terminals 13 and 16 are also adapted for connection to the battery positive and negative terminals, respectively, as part of the charging current path. The leads connected to the battery charge terminals 13 and 16 are of higher current capacity than the leads connected to the battery sense terminals 14 and 15. Although seemingly redundant, the use of separate battery sense terminals eliminates voltage drops present in the charging lines, thereby providing more accurate voltage sensing and more precise system control. The system is arranged to automatically sense the voltage applied to charge terminals 13, 16 if there is no connection to the sense terminals 14 and 15. Additional terminals 17, 18 are provided to connect the system load to the controller.

Also provided on panel 10 is a liquid crystal display (LCD) 20 for displaying different parameters measured by the controller. Associated with LCD 20 are three indicator lamps 21, 22 and 23 to identify which parameter is being displayed. Lamp 21 is lit when the sensed battery voltage is displayed; lamp 22 is lit when the PV array current is displayed; and lamp 23 is lit when the measured load current is displayed. Adjacent these lamps is a two-state pushbutton switch 24 permitting all connections between the controller and the PV array, and between the controller and the load, to be disconnected when the switch is actuated to one of its states. In the second state, switch 24 reconnects the load and array to the controller.

Five light emitting diodes (LEDs) LED1, LED2, LED3, LED4 and LED5 are also mounted on panel 10. LED1 indicates the type of battery that is connected to the controller; this indicator is energized for a sealed battery and de-energized for a flooded battery. A select pin 25 is disposed adjacent LED1 and permits the system installer to make a momentary connection between the pin and the negative terminal of the battery to be sure that the correct type of battery is displayed at LED1 and stored in the controller.

LED2 is the charge status indicator and is energized whenever the battery is being charged.

LED3, LED4 and LED5 are energized to reflect the state of charge of the battery. Specifically, LED5 is a red indicator and is energized when the battery voltage is in a predetermined undervoltage range. LED4 is a yellow indicator that is energized when the battery voltage is in the next higher range but below the desired regulation voltage $V_r$. LED3 is a green indicator that is energized when the sensed battery voltage is just below or at the $V_r$ level.

Figure 2:
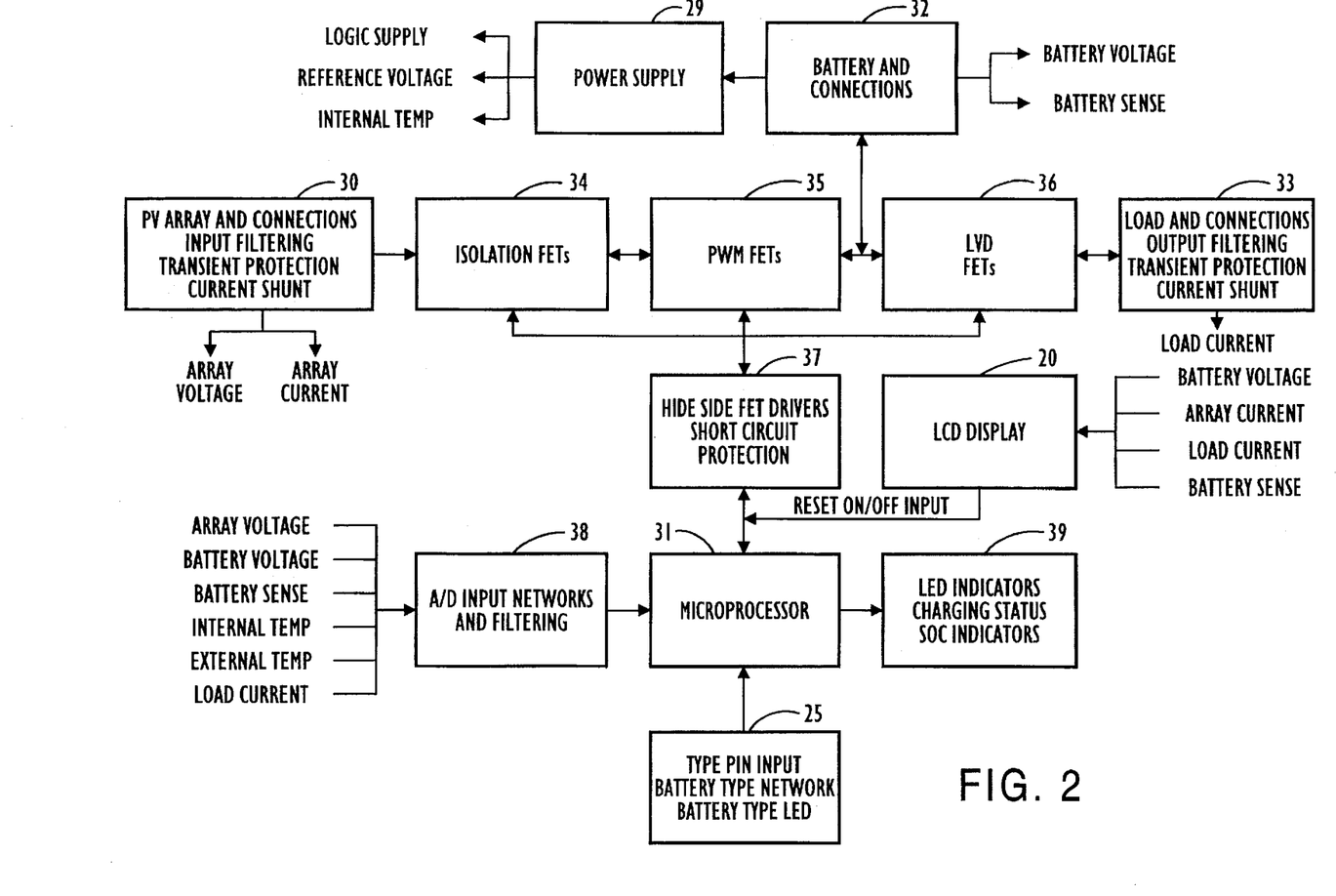
FIG. 2 is a functional block diagram of the PV system controller of FIG. 1.

Referring to the functional block diagram of the controller in FIG. 2, the controller power supply is represented by block 29. Block 30 represents the PV array and its connections, filtering, transient protection and current shunt. The output voltage and current from the array are monitored by the controller microprocessor and by the meter for which LCD display 20 provides a visual indication. The battery and its connections are represented by block 32, and the load with its filtering and protective circuitry is represented by block 33. A circuit 34 comprising PV array isolation FETs, under microprocessor control, serves to prevent the battery from discharging back into the PV array when the battery terminal voltage exceeds the array output voltage. A PWM charging FET circuit 35, also controlled by microprocessor 31, applies charging current from the PV array 30 to battery 32. This charging current, as described in detail below, has a PWM waveform at a fixed frequency, nominally 300 Hz, with a duty cycle, selectable as a function of the sensed battery voltage, in increments over a complete range of 0% to 100%. The increments in the preferred embodiment are approximately 6%.

A load disconnect FETs circuit 36, likewise controlled by microprocessor 31, is operable to disconnect the load 33 from battery 32 should the battery voltage fall below a predetermined undervoltage level or exceed a predetermined overvoltage level. A driver circuit 37 for the FETs circuits 34, 35 and 36 is also controlled by the microprocessor and includes short circuit protection by turning off the FETs.

An analog to digital converter circuit 38 converts the various monitored and sensed analog signals to digital form for processing by microprocessor 31. The various indicators LED1 through LED5, represented by block 39 are energized under microprocessor control. Display 20 and status pin 25 are also shown controlled by or connected to the microprocessor.

Details of the functional blocks illustrated in FIG. 2 are provided in FIGS. 3–8 to which specific reference is now made.

Figure 3A:
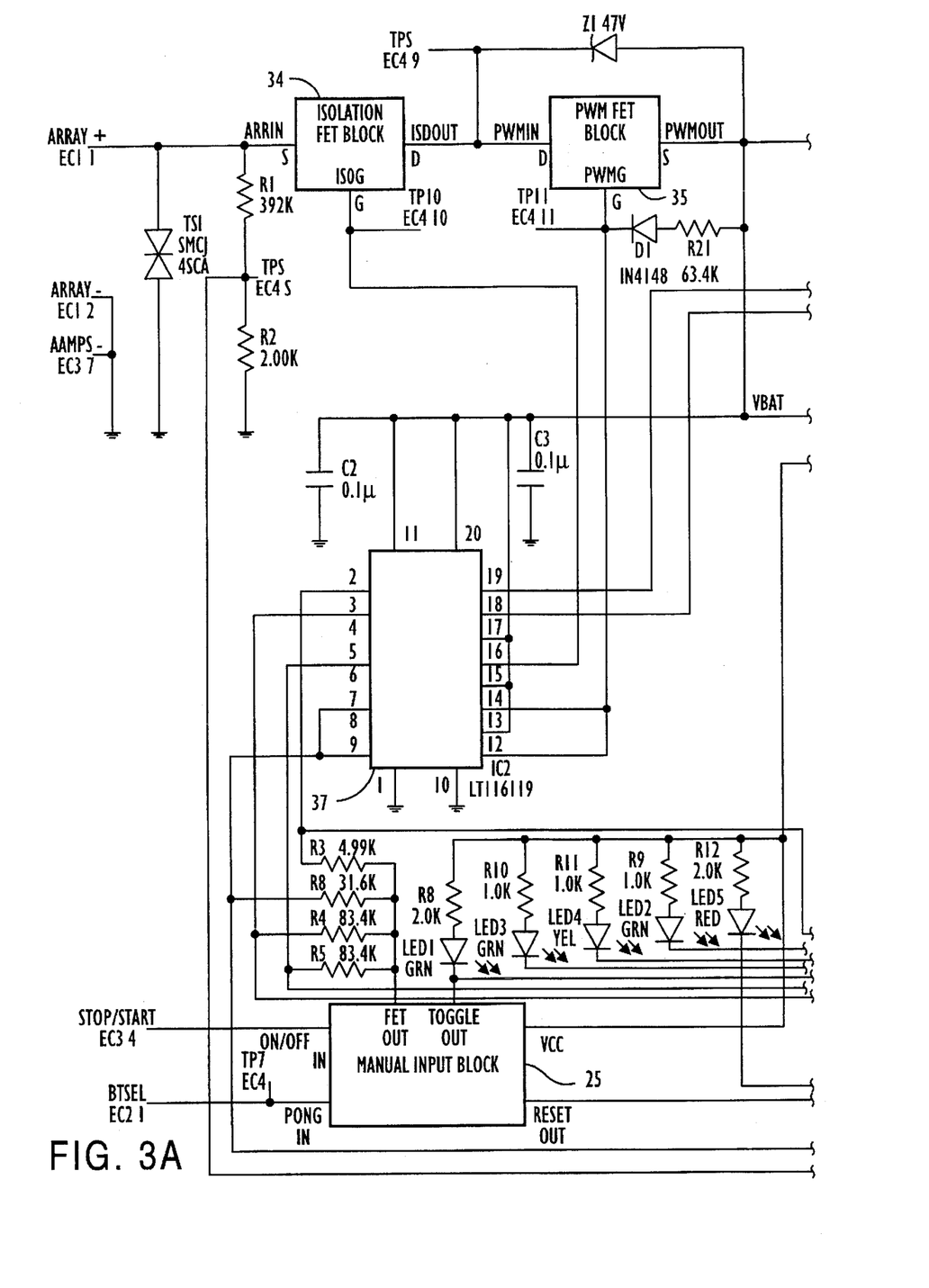
FIG. 3 is an electrical schematic diagram of the PV system controller of FIG. 2.
Figure 3B:
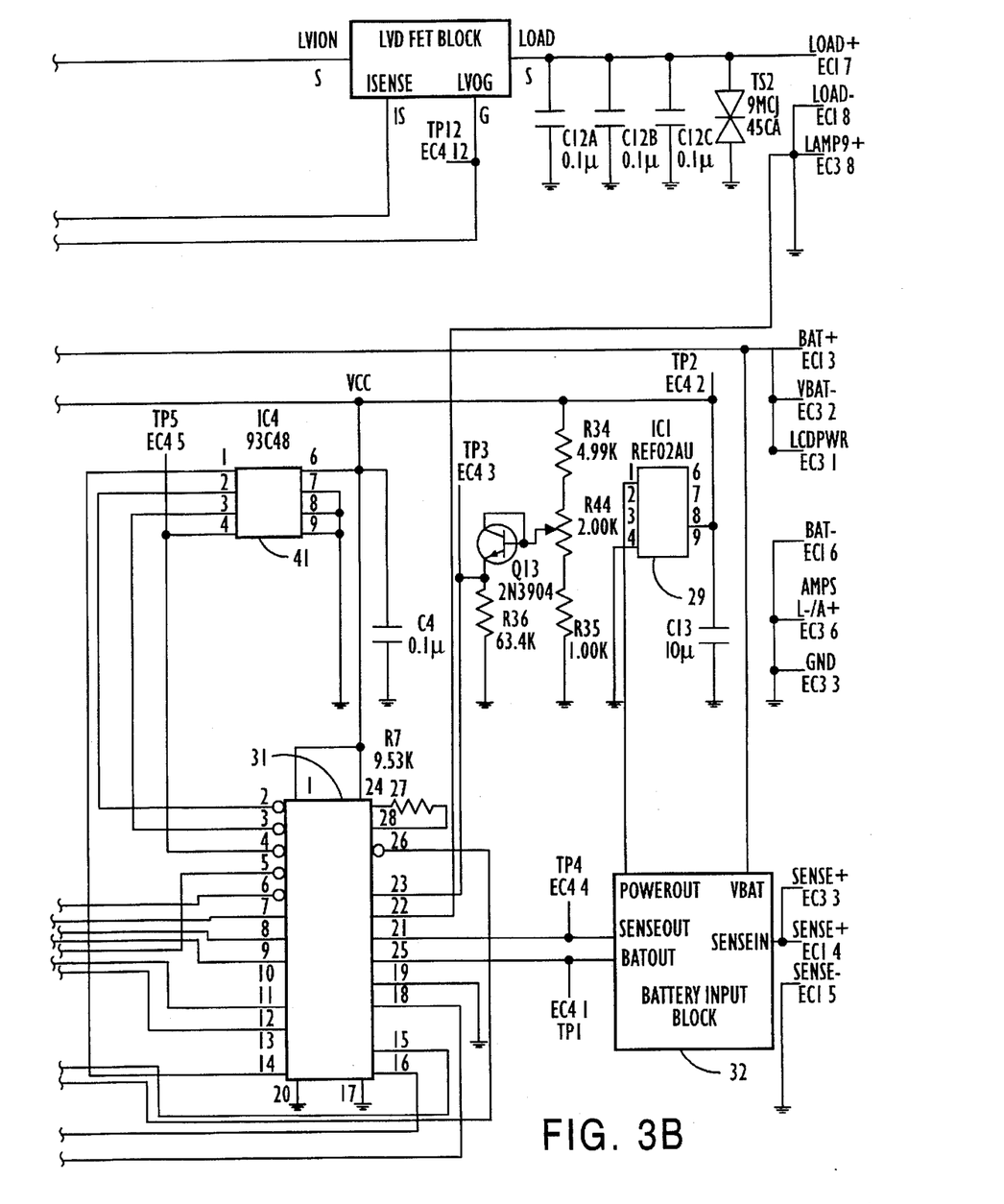
Figure 4:
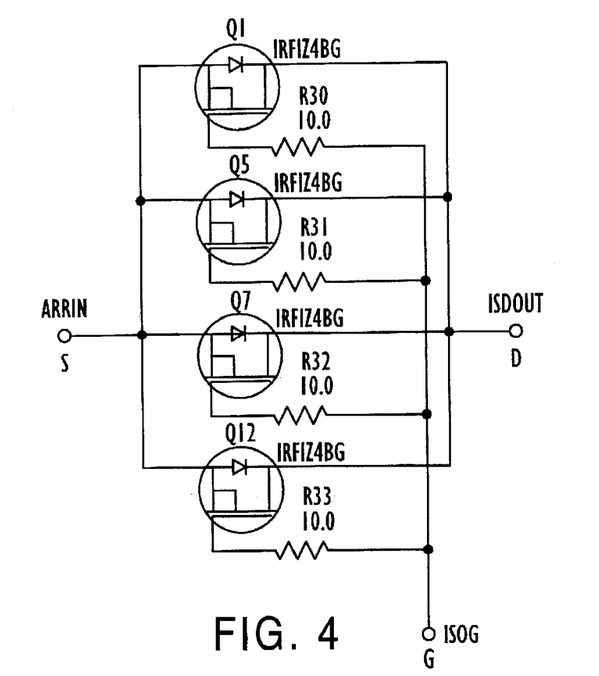
FIG. 4 is an electrical schematic diagram of the isolation FET block shown in FIG. 3.

The PV array (not shown in FIG. 3) and its associated circuitry designated by reference numeral 30 in FIG. 2 appears in the upper left hand corner of FIG. 3 and includes a transient surge protector TS1 connected between the positive PV array output line and ground. In addition, a precision voltage divider comprising resistors R1 and R2 provides an output voltage signal utilized at microprocessor 31 to measure the array voltage. The isolation FET block 34, illustrated in detail in FIG. 4, includes four FETs Q1, Q6, Q7 and Q12 connected completely in parallel so as to be simultaneously switched between on and off states. This circuit is arranged for "soft" turn on meaning that the gate drive is limited to eliminate transients created at the time of connecting the PV array to the battery. In this manner, loads that are very sensitive to voltages can be run without creating overvoltage conditions. The FETs have very fast rise times when switched (i.e., shorter than 50 microseconds) to assure that sulfate build-up on the battery plates is broken down.

Figure 5:
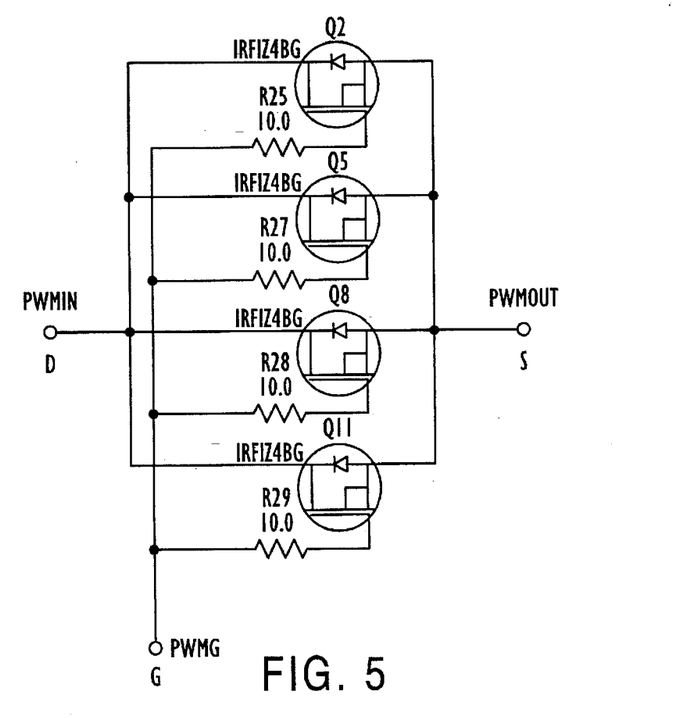
FIG. 5 is an electrical schematic diagram of the PWM FET block shown in FIG. 3.

The PWM FET block 35 is illustrated in greater detail in FIG. 5 and includes four parallel-connected FETs Q2, Q5, Q8 and Q11. This circuit, likewise, is designed for "soft" turn on, and all four FETs are triggered on and off simultaneously with fast rise times.

Figure 6:
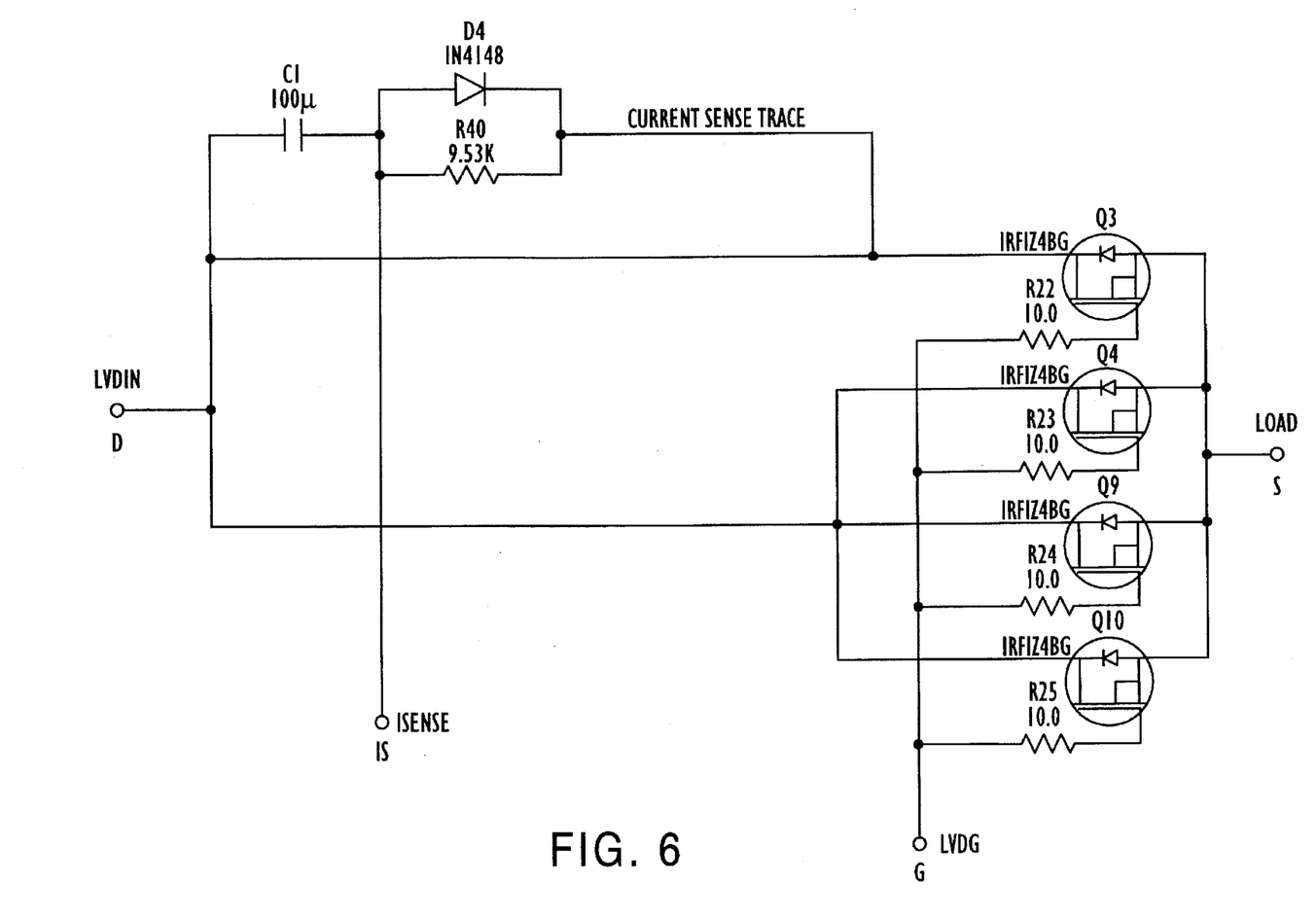
FIG. 6 is an electrical schematic diagram of the LVD FET block shown in FIG. 3.

The LVD FET block 36 is illustrated in greater detail in FIG. 6 and also includes four FETs Q3, Q4, Q9 and Q10 connected in parallel. A load current sensing circuit including a capacitor C1 connected in series with the parallel combination of a diode D4 and resistor R40 is connected to provide a monitoring line (ISENSE) for current through this block.

It will be appreciated from the schematic diagram of FIG. 3 that the isolation FET block 34 is connected to be controlled by driver 37, which in turn is controlled by microprocessor 31, to selectively open or close the path from the PV array to the battery, such as would be required to protect the army. The PWM FET block 35 is also controlled by driver 37 under the control of microprocessor 31, and the FETs therein are turned on and off according to the duty cycle requirements described herein. The LVD FET block 36 serves to disconnect the load from the battery under conditions warranting such action.

The schematic diagram of FIG. 3 also illustrates an EPROM 41 associated with microprocessor 31 in a conventional manner. The circuits associated with LED 1 through LED5 are also shown controlled by microprocessor 31.

Figure 7:
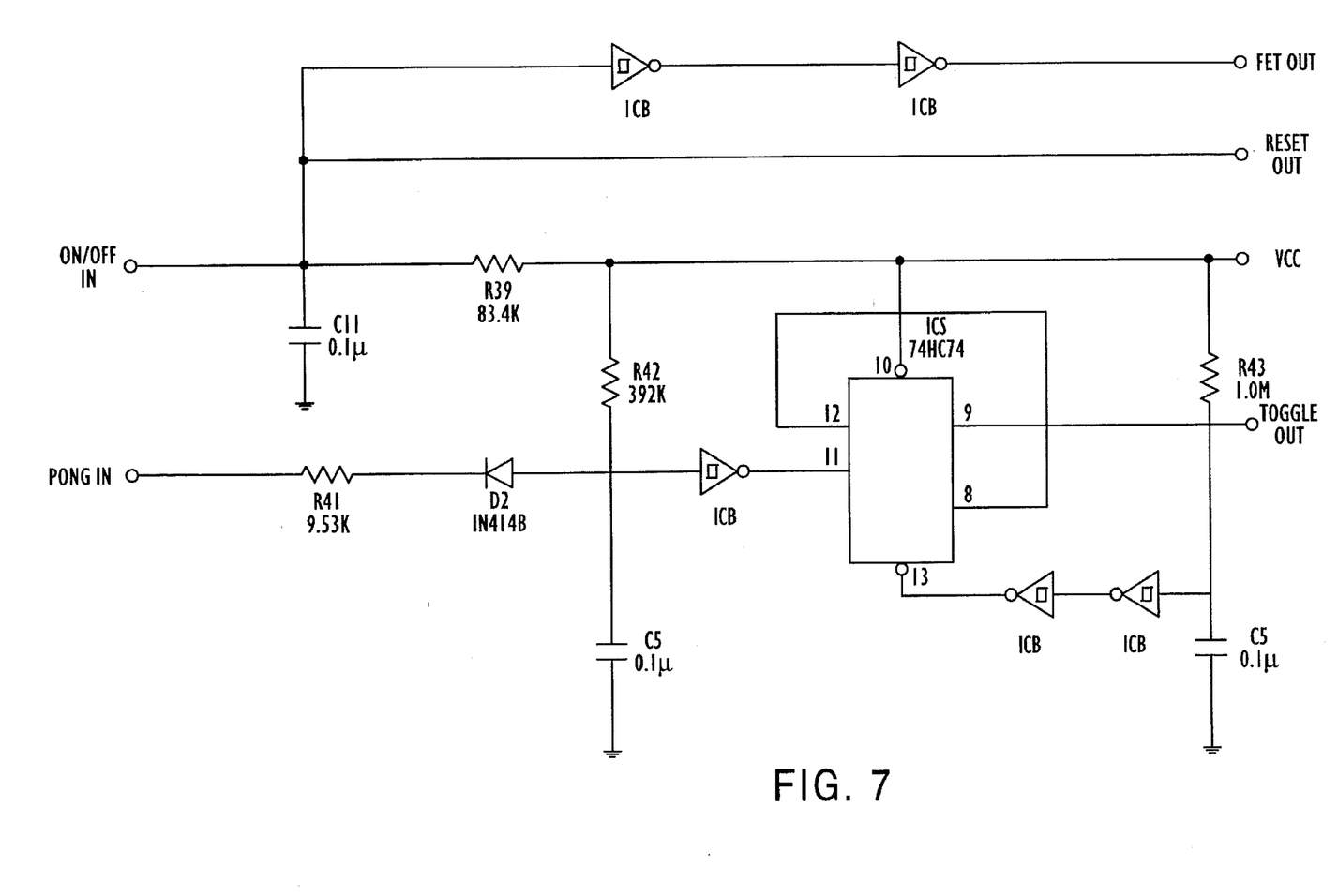
FIG. 7 is an electrical schematic diagram of the manual input block shown in FIG. 3.

The manual input block 25, illustrated in detail in FIG. 7, includes a flip flop IC5, clocked in response to voltage applied to the select pin to indicate the battery type and energize or de-energize LED1 accordingly. The on/off input line shown in FIG. 7 responds to the state of the pushbutton disconnect switch 24 to enable or disable the FET blocks 4, 35, 36 by changing the voltage applied to resistors R3, R6, R4 and R5.

Figure 8:
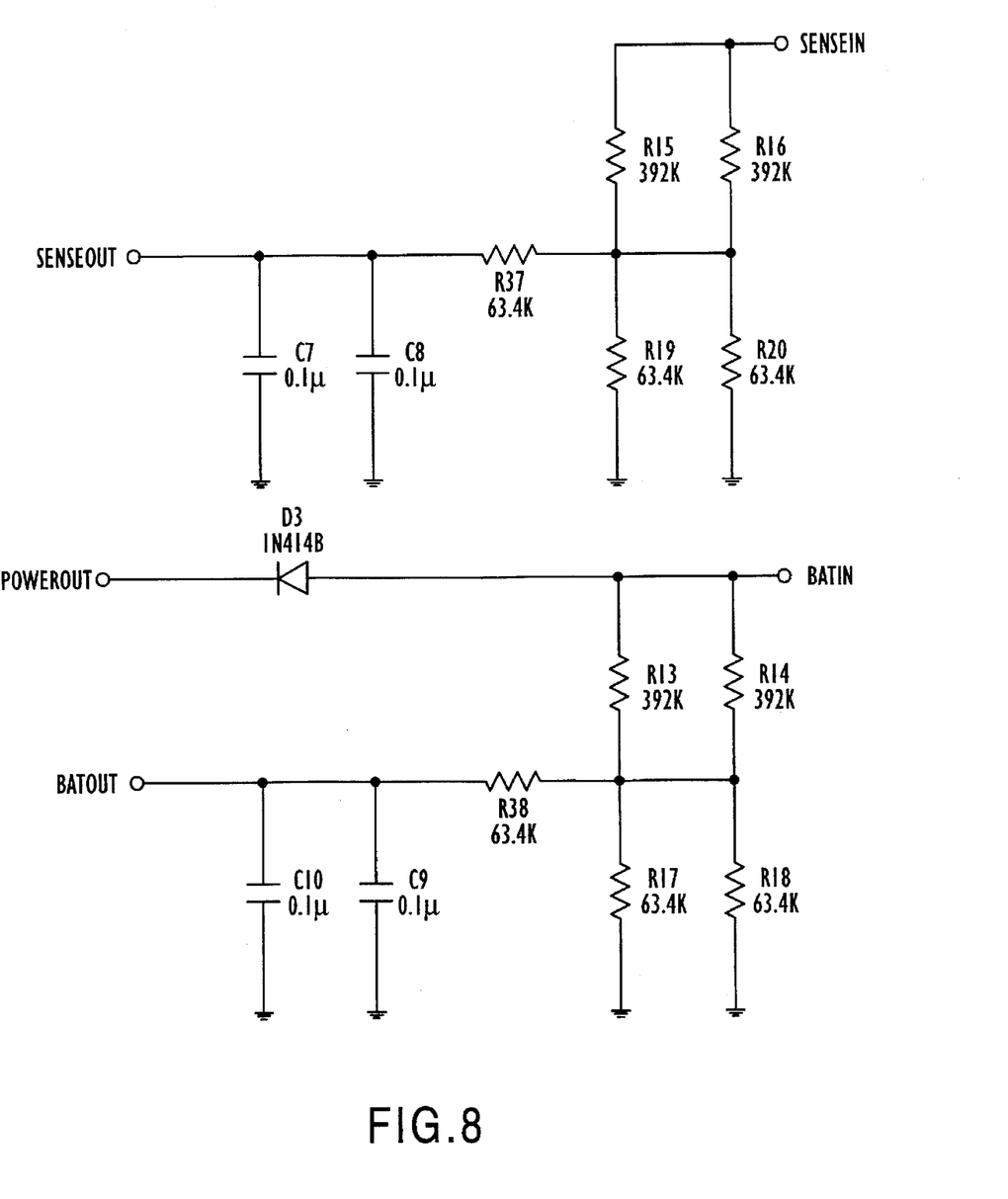
FIG. 8 is an electrical schematic diagram of the battery input block shown in FIG. 3.

Battery input block 32, illustrated in detail in FIG. 8, includes circuitry utilized to reduce the sensed battery and battery line voltages to levels useful with the microprocessor and other circuitry. In addition, filtering of the sense and battery lines is effected in this circuit.

Transistor Q13 is a temperature responsive transistor connected in an emitter-follower mode to provide a temperature compensation signal to microprocessor 31. The base of transistor Q13 is connected to an adjustable resistor R44 to permit temperature calibration prior to installation of the controller.

Figure 9:
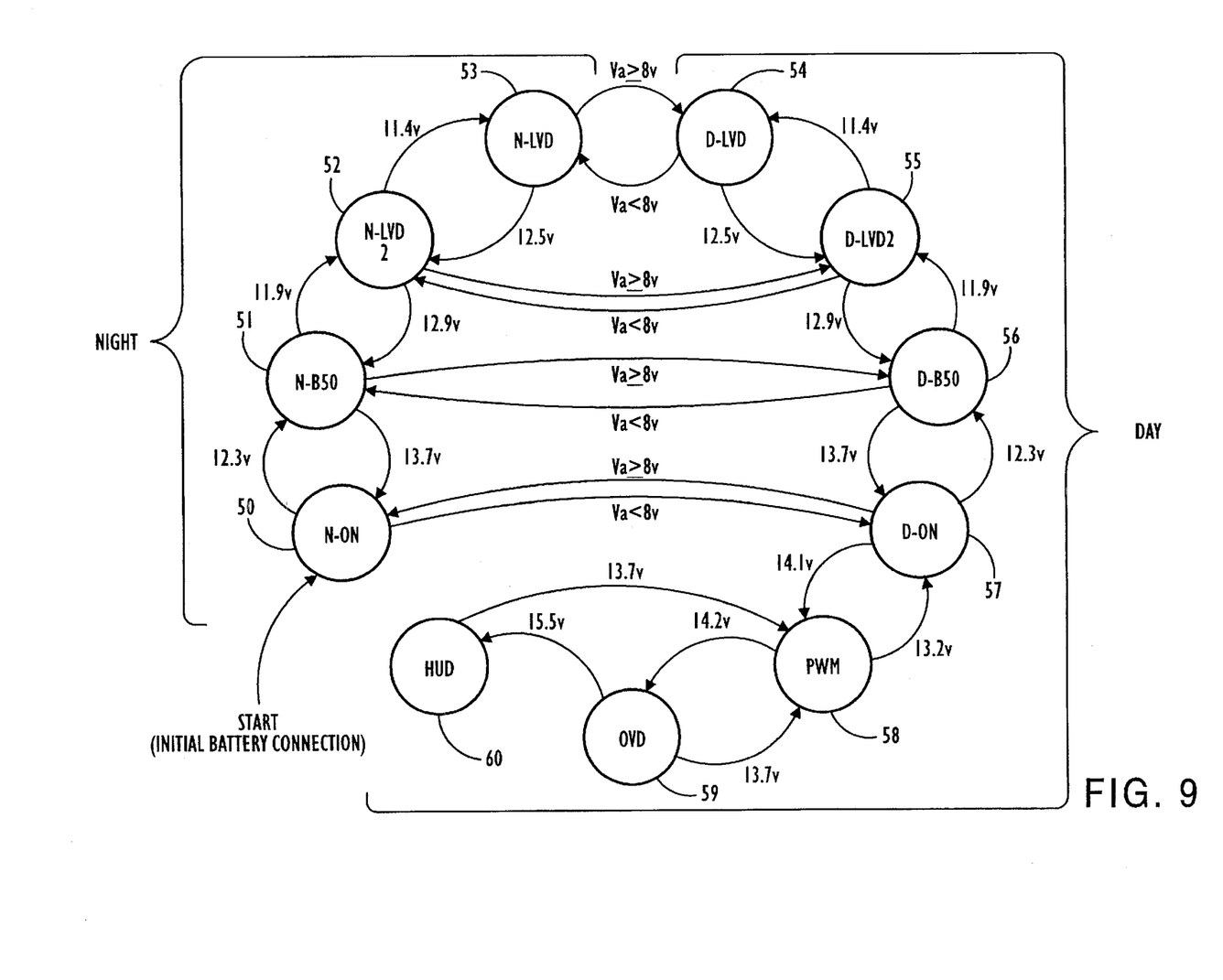
FIG. 9 is a system state diagram of the controller of FIG. 1.

Operation of the system, as defined by software controlling the microprocessor 31, may be easily understood from the system state diagram illustrated in FIG. 9 to which specific reference is now made. Upon initial battery connection to the controller, the system is automatically placed in the N-ON state 50. Under these circumstances, if the array voltage $V_a$ is less than 8.0 volts, which is typically a nighttime condition, the system remains in state 50, depending upon the sensed battery voltage. LED3 is energized to indicate the initial start up condition. The isolation FETs 34 are off to prevent battery discharge into the PV array, and the PWM FETs 35 are off so that no charge current path exists between the PV array and the battery. The LVD FETs 36 are energized to maintain the load connection to the battery.

It is noted that the various lines illustrated between states in FIG. 9 represent paths from one state to another, and each path is associated with a particular voltage. The voltages for the paths between a night state and a day state are PV array voltages ($V_a$) and are all 8.0 volts. In other words, if the array voltage is equal to 8 volts or more, the system is in one of the day states; if the array voltage is less than 8.0 volts, the system is a night state. All of the other paths between states are either between different day states or between different night states, and the voltages associated with each of these paths are all battery voltages. Thus, assuming the system initially to be in state 50 with the array voltage $V_a$ less than 8 volts, if the battery voltage falls below 12.3 volts the system switches to night state 51 designated N-B50 indicating that the battery is at approximately its 50% charge condition. In this state the yellow LED4 is energized but FETs 34 and 35 remain non-conductive while FETs 36 remain conductive. In order for the system to return to state 50 from state 51, the battery voltage must increase to 13.7 volts.

If the battery voltage falls to 11.9 volts, the system enters night state 52, designated N-LVD2, wherein the red LED5 is caused to flash and indicate that there is a low charge state for the battery. FETs 34 and 35 remain non-conductive to prevent discharge into the array and to block the PWM charge current path. FETs 36 remain conductive to permit the battery to drive the load. If the battery voltage falls further to 11.4 volts or less, night state 52 (N-LVD) is entered. In this state the battery voltage is considered too low to remain connected to the load without the battery being damaged. Accordingly, all of the FETs 34, 35 and 36 are rendered non-conductive and LED5 is caused to continuously light.

Note that should the battery voltage increase while the system is in any of night states 53, 52 or 51, the state would change to another night state depending upon the particular sensed battery voltage. For example, if the system is in state 53 and the battery voltage increases to 12.5 volts, the system switches to state 52. Likewise, a battery voltage increase to 12.9 volts takes the system to state 51, and a battery voltage increase to 13.7 volts takes the system to state 50.

If, while the system is in any of the night states 50, 51, 52 or 53, the array voltage $V_a$ increases to be equal to or greater than 8.0 volts, the system automatically switches to a corresponding day state 57, 56, 55 or 54, respectively, of corresponding battery voltage. This would occur when there is a sufficient amount of sunlight to increase the PV array voltage to 8 volts. Thus, if the system is in night state 50 (NOON) when the battery voltage is between 12.3 volts and 13.7 volts, as the array voltage increases to 8.0 volts the state changes to the D-ON state 57 corresponding to the same battery voltage level. In this day state, however, unlike corresponding night state 50, the PV array is able to charge the battery. Accordingly, all of the FETs 34, 35 and 36 are conductive. LED2 is energized to indicate a charging mode, and LED3 is energized to indicate full battery charge. If the battery voltage now drops to 12.3 volts, the D-B50 state 56 is entered wherein the battery is at its 50% charge level. In this state LED2 is energized to indicate a charging mode and LED4 is energized to indicate a 50% charged battery condition. All of the FETs are conductive in this state.

If the battery voltage now drops to 11.9 volts, the D-LVD2 state 55 is entered wherein low battery charge indicator LED5 is caused to flash, and the charge mode indicator LED2 remains energized. All of the FETs 34, 35 and 36 remain conductive. A still further lowering of the battery voltage to 11.4 volts invokes state 54 (D-LVD) wherein LED2 and LED5 are energized, FETs 34 and 35 are conductive, but FETs 36 are rendered non-conductive to disconnect the load from the battery.

As noted above, day states 54, 55 and 56 can be entered directly from a respective corresponding night state, depending upon the battery voltage at the time the array voltage increases to 8.0 volts. Once the system is in any of those day states, an increase in battery voltage as the battery is charged takes the system to the next battery level day state. Thus, if the system is in day state 54, a battery voltage increase to 12.5 volts results in a change to state 55. From state 55 the system switches to state 56 when the battery voltage increases to 12.9 volts. A subsequent change to state 57 is achieved when the battery voltage increases to 13.7 volts.

In all of states 54, 55, 56 and 57, the charging current is at 100% duty cycle, meaning that the charging current is continuous without any pulsed interruption. If the battery voltage increases to 14.1 volts (which for purposes of the disclosure herein is considered the regulated battery voltage $V_r$) the system switches to state 58 (PWM). In this state, the PWM FETs 35 operate in an alternating variable duty cycle PWM mode wherein the duty cycle depends on the sensed battery voltage. FETs 34 and 36 are conductive. LED 2 and LED 3 are both energized in state 58. The PWM FETs 35 are conductive only for the portion of the 300 Hz cycle in which charging current is needed to maintain the battery voltage at the $V_r$ set point which, in the example given herein for a 12 volt battery, is 14.1 volts. It should be noted that once the 12 volt battery reaches this 14.1 volt level, it accepts only a reduced charge current as required to fully charge the battery. Charge current above that amount causes a gasification and heating problems as described in the background section hereinabove. The PWM technique utilized in the present invention, effected by switching PWM FETs 35 under the control of microprocessor 31, supplies only the additional current needed to maintain full charge.

It should also be noted that battery voltage measurements are 10-bit numbers so that voltage variations, useful for effecting duty cycle changes, can occur even though the battery voltage remains nominally at 14.1 volts.

If, while the system is in the PWM state 58, the sensed battery voltage drops to 13.2 volts, the system returns to state 57 described above wherein PWM FETs 35 are continuously conductive to provide a 100% duty cycle. On the other hand, it is possible for the system to go to the other extreme, i.e., a 0% duty cycle. Specifically, if while in the PWM state 58 the system experiences a rise in sensed battery voltage to 14.2 volts, an OVD (overvoltage disconnect) state 59 is invoked. In this state, the PWM FETs 35 are non-conducting to provide no charge current; hence, a 0% duty cycle is in force. FETs 34 and 36 remain conducting. The battery continues to drive the load but no charging current is supplied in this state since FETs 35 are nonconducting. LED 3 remains energized but, because there is no charging of the battery in this state, LED 2 is de-energized. The system returns to PWM state 58 from OVD state 59 when the sensed battery voltage drops to 13.7 volts. In this regard, the sensed battery voltage levels that determine when switching is to occur between the various states are selected to be sufficiently far apart to substantially eliminate oscillation or dither between states. For example, the 13.7 volt level required to switch from state 59 to state 58 is sufficiently below the 14.1 volt $V_r$ regulation level as to require some finite time interval in the PWM state 58 before the battery is charged such that its terminal voltage reaches 14.1 volts. A similar hysteresis effect is provided between states 57 and 58 and between other adjacent states, as needed.

An HVD (high voltage disconnect) state 60 is invoked if, while the system is in the OVD state 59, the sensed battery voltage rises to 15.5 volts. This is considered an overvoltage condition and, in order to protect the load and the controller, all FETs 34, 35 and 36 are rendered non-conductive. Accordingly, the load and PV array are effectively disconnected from the battery. In this state only LED 3 is energized. Note that there is no entry into the OVD state 59 from HVD state 60; rather, if the sensed battery voltage falls to 13.7 volts, the system returns to the PWM state 58. This is the same battery voltage required to return the system to PWM state 58 from OVD state 59.

The software in microprocessor 31 for controlling battery charging and regulation may be looked upon as a repetitive control loop containing thirty-two steps of equal time duration. In the preferred embodiment the equal time steps have a duration of $\frac{1}{1200}$ seconds (0.833 ms), and the time to complete an entire thirty-two step cycle of the loop is therefore is $\frac{8}{300}$ seconds (26.7 ms). During each step the system performs particular functions requiring various operations. These steps are described in detail below. If, during the course of loop operation, a fault is detected, the described main loop invokes subroutines outside the loop to process the fault condition. These subroutines are not described herein.

It will be appreciated that, for the loop step time intervals specified for the preferred embodiment, each period of the 300 Hz PWM charge current signal has a time duration corresponding to four steps in the main loop (i.e., 4×0.833 ms=3.33 ms). The sensed battery voltage is measured every 13.33 ms (i.e., once during every sixteen steps), and four successive measurements are averaged to provide an update every sixty-four steps, or every 53.3 ms. The PWM duty cycle is corrected upon each such evaluation of the sensed battery voltage. These frequent updates and duty cycle corrections have been found to maintain the battery charge at an optimal level with minimal variation from the $V_r$ regulation set point.

Duty cycle corrections are made in approximately six percent increments, although since 100% is not a multiple of six percent, certain PWM increments are made larger. Thus, for example, one PWM duty cycle is at eighteen percent and the next one is at twenty-five percent; likewise, the duty cycle following forty-three percent is fifty percent; etc. In any case, adjustment of the pulse width (i.e., the duty cycle) is a function of the difference between the sensed battery voltage and the voltage regulation set point $V_r$.

As an example of typical duty cycle operation, the battery may be slightly overcharging with a forty-three percent duty cycle for approximately ten seconds, then drop down to a slightly undercharging condition at thirty-seven percent duty cycle for a half second, then return to forty-three percent duty cycle, etc. Typical voltage variation in the $V_r$ set point, as the duty cycle automatically varies, has been found to be on the order or +/−0.002 volts. This represents extremely stable regulation.

The main loop steps are as follows:

Step (1): Flash and PWM Start—This step controls the flashing of LED 1 (the battery type indicator) and LED 5 (the low voltage warning indicator), and is responsible for turning the PWM FETs 35 on at the time required by the sensed battery voltage. PWM FETs 35 may start the charging current pulse at any one of four predetermined time positions within this step, again depending upon the sensed battery voltage. If duty cycles of six, twelve or eighteen percent are in force, the charging current pulse is terminated, by rendering PWM FETs 35 nonconductive, at the end of this step.

Step (2): Convert Temp—The analog temperature output signal from transistor Q13 is converted to a binary value. Two conversions are performed and the sum is stored in working registers in microprocessor 31. Current and temperature compensation values are reset every sixteenth time this step is executed. Charging current pulses in PWM duty cycles of twenty-five percent and forty-four percent, begun in step (1), are turned off at the end of this step.

Step (3): OTD and HTD—Over-temperature (greater than 60° C.) and high temperature (greater than 70° C.) conditions are tested in this step. If a temperature problem flag is set in the microprocessor, the over-temperature reconnect (less than 50° C.) and high temperature reconnect (less than 60° C.) are tested. Charge current pulses in PWM duty cycles of fifty percent to sixty-eight percent, begun in step (1), are turned off at the end of this step.

Step (4): Validate and Save Temp—The temperature measured in step (2) is checked to make sure that the circuit including transistor Q13 is properly functioning. The measured temperature must be above 50° C. and below 90° C. If the external temperature measurement has recorded valid temperature readings, the current values are discarded; otherwise they are stored. Charging current pulses in pulse width modulation duty cycles of seventy-five percent to ninety-three percent, begun in step (1), are turned off at the end of this step.

Step (5): PWM Start—This step is responsible for turning the PWM FETs 35 on at the time required by the sensed battery voltage. The PWM FETs may be started at any one of four predetermined time positions within this step. Charge current pulses for duty cycles of six percent through eighteen percent, begun during this step (5), are terminated at the end of this step.

Step (6): Convert Load Current—The load current is converted to a binary value. Two conversions are performed, and the sum is stored in working registers. Charge current pulses for duty cycles of twenty-five percent through forty-four percent, begun in step (5), are terminated at the end of this step.

Step (7): Validate and Save—The load current is monitored to make sure that a value of less than a predetermined maximum is measured. For example, this maximum may be one hundred amperes. The current is added to the sum in the load current register if less than some default maximum number of measurements are currently stored. Current pulses for duty cycles between fifty percent and sixty-eight percent, begun in step (5), are terminated at the end of this step.

Step (8): Calculate and Store Current Compensation—Every sixteenth time that the main loop repeats, this step is effected. The value in the load current register is used to calculate a current compensation value which is stored in the microprocessor. The load current register is then set to zero. Charge current pulses for duty cycles of seventy-five percent through ninety-three percent, begun in step (5) are terminated at the end of this step.

Step (9): PWM Start—This step is responsible for initiating the charge current pulse by turning on the FETs at any one of four time positions determined by the sensed battery voltage. The charge current pulse is turned off at the end of this step for PWM duty cycles of six percent through eighteen percent.

Step (10): Convert Battery Sense—The battery sense voltage is converted to a binary value. Two conversions are performed and the sum is stored in working registers in the microprocessor. Current pulses, begun in step (9) are terminated at the end of this step for duty cycles of twenty-five percent through forty-three percent.

Step (11): Validate and Save Sense Voltage—The battery sense voltage is validated and must exceed six volts. Valid values are saved in the battery voltage register. Charge current pulses begun in step (9) are terminated at the end of this step for duty cycles of fifty percent through sixty-eight percent.

Step (12): Up/Down Transitions—The present battery voltage is compared through the up and down transition voltages for the present operating state. The up and down transition values are the values illustrated for the various paths in FIG. 9. If the battery voltage is greater than the up value or less than the down value, an up/down state transition count flag is set. Current pulses begun in step (9) are terminated at the end of this step for duty cycles of seventy-five percent through ninety-three percent.

Step (13): PWM Start—This step is responsible for turning the PWM FETs 35 on at the appropriate one of any of four time positions to thereby initiate a charge current pulse. The charge current pulse is terminated at the end of this step for duty cycles of six percent through eighteen percent.

Step (14): Convert Battery Voltage—The battery voltage is converted to a binary value during this step; two conversions are performed and the sum is stored in working registers. Charge current pulses begun in step (13) are terminated at the end of this pulse for duty cycles of twenty-five percent through forty-four percent.

Step (15): Validate and Save Battery Voltage—The battery voltage is validated and must be greater than two volts. If the battery voltage is at an invalid level, an emergency disconnect occurs immediately. If the battery sense voltage is invalid, the battery voltage is saved to the battery registers in the microprocessor. The charge current pulse initiated in step (13) is terminated at the end of this step for duty cycles of fifty percent through sixty-eight percent.

Step (16): PWM Adjust—The PWM duty cycle is adjusted if the controller is in the PWM mode (i.e., state 58 in FIG. 9). The adjustment step is approximately 6%. Charge current pulses begun in step (13) are terminated at the end of this step for duty cycles of seventy-five percent to ninety-three percent.

Step (17): PWM Start—This step is responsible for turning the PWM FETs 35 on to initiate a charge current pulse at the appropriate one of four predetermined times during this step. Charge current pulses are terminated at the end of this step for PWM duty cycles between six percent and eighteen percent.

Step (18): Convert External Thermistor—The external thermistor voltage is converted to a binary value. Two measurements are converted and the sum is placed in working registers. In addition, the charge current purse initiated in step (17) is terminated at the end of this step for duty cycles of twenty-five percent to forty-four percent.

Step (19): Validate and Save Temperature—The thermistor voltage is validated as in the step (4) above. If the external thermistor voltage is valid and if the number of stored values is less than a predetermined temperature limit, that voltage is summed with the present value in the temperature registers. Every two hundred and fifty six times that this step is executed, all of the PWM FETs 35 are rendered nonconductive (even if the controller is not in the PWM mode). The present charging current pulse, initiated in step (17), is terminated at the end of this step for duty cycles of fifty percent through sixty-eight percent.

Step (20): Calculate Temperature Compensation Value— Every sixteenth time this step is effected, the value stored in the temperature registers is used to calculate the temperature compensation for the system controller. This value is stored in the temperature compensation register. At the end of this step, the charging current pulse initiated in step (17) is terminated for duty cycles between seventy-five percent and ninety-three percent.

Step (21): PWM Start—This step is responsible for initiating a charging current pulse by turning the PWM FETs 35 on at any one of four predetermined time positions during this step as determined by the sensed battery voltage. The charge current pulse is turned off at the end of this step for duty cycles of six percent through eighteen percent. The PWM FETs 35 are not turned on during this step if during step (19) the PWM FETs 35 were disabled for this cycle of the loop.

Step (22): Convert Array Voltage—The PV array voltage is converted to a binary value. Two measurements are taken and the sum is stored in working registers. The charging current pulse initiated in step (21) is terminated at the end of this step for duty cycles of twenty-five percent through forty-four percent.

Step (23): Day/Night Transition Check—Each time step (19) has disabled the PWM FETs 35, the PV array voltage is checked to see if it is currently daytime, (i.e., $V_a$ is greater than or equal to eight volts) or nighttime ($V_a$ is less than eight volts). An array transition flag is set. Charge current pulses initiated during step (21) are terminated at the end of this step for duty cycles of fifty percent through sixty-eight percent.

Step (24): Watch Dog Timer Reset and Memory Clear— The watchdog timer is reset during this step. Temporary memory slots used for temperature storage are reset every sixteenth time this step is executed. Charge current pulses initiated in step (21) are terminated at the end of this step for duty cycles from seventy-five percent through ninety-three percent.

Step (25): PWM Start—This step is responsible for initiating a charging current pulse by turning PWM FETs 35 on at any one of four predetermined time positions during this step as determined by the sensed battery voltage. The charge current pulse is turned off at the end of this step for present duty cycles of six percent through eighteen percent.

Step (26): State Change and Equalization—The up/down array transition counter flags are used to check for a state transition (i.e., 256 consecutive counts or 6.5 seconds, or 2048 consecutive counts, or 53.5 seconds, depending upon the state). The day/night counter flags are utilized to check for a sunrise/sunset transition (16 consecutive flag counts or 2 minutes). The flags and counters are reset when a transition occurs. The equalization status of the battery is maintained in this step and is updated during day to night transitions. In other words, if equalization is to occur every seventeen days, the transition count is utilized to keep track of the last equalization. Charge current pulses initiated in step (25) are terminated at the end of this step for duty cycles of twenty-five percent through forty-four percent.

Step (27): Load Masks and Set Points From RAM—The output masks and operating set points for the state determined in step (26) are loaded from RAM in microprocessor 31. Charge current pulses initiated in step (25) are terminated at the end of this step for duty cycles of fifty percent through sixty-eight percent.

Step (28): Load Masks and Set Points From EPROM— The output masks for the current state are loaded from EPROM. Charge current pulses are begun in step (25) are terminated at the end of this step for duty cycles from seventy-five percent through ninety-three percent.

Step (29): PWM Start—This step is responsible for initiating the current charge pulse by turning PWM FETs 35 on at any one of four predetermined time positions during this step. The charging current pulse is terminated at the end of this step for duty cycles from six percent through eighteen percent.

Step (30): Test Load Status—The status of load disconnects is checked. If LVD FETs 36 have been turned off by drivers 37, microprocessor 31 shuts the controller down. Charge current pulses initiated in step (29) are terminated at the end of this step for duty cycles of twenty-five percent through forty-four percent.

Step (31): Load Regulation Set Point—The regulation set point for the new state (i.e., the states in FIG. 9) is loaded from RAM or EPROM into the microprocessor. This set point cannot be loaded earlier in the loop because it would be uncompensated and would throw the PWM control into an inaccurate operation mode. Charge current pulses initiated in step (29) are terminated at the end of this step for duty cycles of fifty percent through sixty-eight percent.

Step (32): Compensate Set Points—The regulation set point is temperature compensated during this step. The up and down set points are temperature compensated. All of the set points are automatically corrected for twenty-four volt operation if a twenty-four volt battery is being used rather than a twelve volt battery. The charge current pulse initiated in step (29) is terminated at the end of this step for duty cycles of seventy-five percent through ninety-three percent.

The above-described thirty-two step loop repeats continuously.

The system as described is flexible to accommodate either twelve volt or twenty-four volt batteries in that the microprocessor 31 automatically configures in response to the system voltage. In addition, the system includes full electronic protection against reverse polarity connection of the batteries at terminals 13, 14, 15 and 16.

The PV system controller described herein utilizes a PWM charging current, having a duty cycle variable over a range between 0% and 100% in response to the sensed battery voltage, to significantly improve the charging efficiency of the system. Automatic equalizations of the battery (i.e., boost charging) maintains high battery charge conditions. Constant voltage charging with frequent equalizations maintains the battery at high charge states averaging well over ninety percent SOC. This results in higher energy availability to loads. These high SOC levels permit reduction in battery size.

Microprocessor 31 may be any generally available microprocessor programmed to perform the functions described herein, particularly in relation to the main control loop and the states illustrated in FIG. 9. The processor should have a 2 k ROM and a clock speed on the order of 2 MHz.

The system described above assumes a twelve volt battery connected to the controller; a twenty-four battery can likewise be connected wherein all of the voltage levels for the battery set forth in the description and drawings would be doubled.

The system as described is adaptive in the sense that the PWM duty cycle follows even slight variations in the battery voltage from its regulated value ($V_r$=14.1 volts). The duty cycle response, and the resulting responsive change in charging current, is rapid and effective to maintain $V_r$ substantially constant even for dramatically varying conditions. For example, if the load on the battery increases significantly at substantially the same time that a dark cloud blocks sunlight and reduces the PV array output current, the high speed sampling of the battery voltage and corresponding adjustment of the changing duty cycle precludes any noticeable difference in the battery terminal voltage. In fact, after considerable testing of the controller under widely varying conditions, the system has never been forced into the OVD state 59 (FIG. 9). The duty cycle adjustment effectively permits the battery to follow the natural charge current versus state of charge characteristic of the battery. Rather than pushing the battery voltage higher or letting it drop lower, the voltage is held constant, and the amount of current adapts to the battery charge requirements.

It should also be pointed out that during equalization procedures (e.g., for a 12 volt battery), the regulated voltage is raised only to 14.35 volts (for a sealed battery). This is contrary to conventional equalization at 15 volts or more. This more "gentle" equalization (i.e., to voltage levels between 1.5% and 2.5% higher than $V_r$) avoids the problem of damaging an unattended battery with too high a charging voltage.

It is also to be understood that PV arrays have their own current versus voltage characteristic which comes into play when switching the array between open circuit and closed circuit conditions during PWM operation. When current flows the array is at some operating point, fixed by the battery, on that characteristic curve. In switching between zero current and the operating point, the array has a certain inherent transition time. The present invention has selected the rise times for the PWM FET switching to match the transition times of the array and thereby minimize damage to the array while maximizing the efficiency of energy utilization from the array in charging the battery.

From the foregoing description it will be appreciated that the invention makes available a novel PV system controller that adapts to the charge requirements of a battery to provide efficient charging and close regulation while protecting the controller and the load against damage.

Having described preferred embodiments of a new and improved photovoltaic system controller and its method of operation according to the present invention, it is believed that other modifications, variations and changes will be suggested to persons skilled in the art in view of the teachings set forth herein. It is therefore to be understood that all such variations, modifications and changes are believed to fall within the scope of the present invention as defined by the appended claims.

What is claimed is:

1. A photovoltaic controller for controlling delivery of charging current from a photovoltaic array to charge and regulate a battery to a voltage $V_r$ while the battery is driving a load, said controller comprising:

switching means connected in series in a charging current path between said array and said battery for alternatively passing and interrupting charging current through said path;

battery voltage sensing means for sensing the voltage across said battery;

means for comparing the sensed battery voltage to $V_r$; and control means for cyclically actuating and deactuating said switching means in a fixed frequency, pulse width modulated mode, said control means comprising pulse width adjustment means responsive to said means for comparing for varying the duty cycle of said pulse width modulation such that the time for passing a charging current pulse during each cycle increases in response to a battery voltage less than $V_r$, and decreases in response to a battery voltage greater than $V_r$.

2. The controller of claim 1 wherein said fixed frequency is in the range between 100 Hz and 600 Hz.

3. The controller of claim 1 wherein said pulse width adjustment means includes means for adjusting the pulse width modulation duty cycle over a range extending from 0% to 100%.

4. The controller of claim 3 wherein said adjustment means includes means for selecting predetermined discrete duty cycles located at spaced percentage intervals between 0% and 100%.

5. The controller of claim 4 wherein said discrete duty cycles are uniformly separated by approximately six or seven percent.

6. The controller of claim 4 wherein said switching means includes means for passing said charging current pulse with a rise time selected to substantially match the inherent transition time for said array in switching from open circuit to battery voltage.

7. The controller of claim 1 further comprising means responsive to said battery voltage being at or below a predetermined low voltage for automatically disconnecting said battery from said load.

8. The controller of claim 1 further comprising means responsive to the voltage across said photovoltaic array being at or below a predetermined low voltage for interrupting said charging current path.

9. The controller of claim 1 further comprising equalization means for automatically equalizing the battery charge by charging the battery to an equalization voltage higher than $V_r$ in response to either: (a) elapse of a predetermined number of days between equalizations; or (b) the battery voltage being at or below a predetermined voltage.

10. The controller of claim 9 wherein said equalization means comprises means for establishing said equalization voltage between 1.5% and 2.5% higher than $V_r$.

11. The controller of claim 1 further comprising processor means for establishing multiple operating states of said controller, each operating state being characterized by a respective unique combination of photovoltaic array output voltage and battery voltage.

12. The controller of claim 1 wherein said switching means comprising a plurality of parallel-connected field effect transistors connected in series between the array and battery.

13. The controller of claim 12 further comprising gate drive means for limiting drive signals actuating said field effect transistors in order to minimize transients in the charging current path upon actuation of said switching means.

14. The controller of claim 1 wherein said pulse width adjustment means includes means for adjusting the pulse width modulation duty cycle over a range extending from 0% to 100%, and further means for selecting predetermined discrete duty cycles in response to the magnitude of said voltage difference.

15. A method of controlling the charging current applied to a battery from a photovoltaic array while said battery is driving a load, said method comprising the steps of:
  (a) applying said charging current to said battery continuously when the battery voltage is below a first predetermined voltage;
  (b) applying said charging current to said battery in pulses of a fixed frequency pulse train when the battery voltage is in a narrow range surrounding a desired regulation voltage; and
  (c) controlling the duration of said charging current pulses as a function of said battery voltage over a duty cycle range extending from 0% to 100%.

16. The method of claim 15 wherein step (b) includes applying said pulses at a fixed frequency in the range extending from 100 Hz to 600 Hz.

17. The method of claim 15 wherein step (b) includes providing said pulses of charging current having a rise time selected to substantially match the inherent transition time for said array when switching from open circuit to battery voltage.

18. The method of claim 17 wherein step (b) comprises alternatively opening and closing a switch connected in series between said photovoltaic array and said battery.

19. The method of claim 15 wherein step (b) includes changing said duty cycle in discrete duty cycle steps in response to corresponding changes in the battery voltage, wherein battery voltage is measured multiple times per second and the duty cycle step is updated in response to the battery voltage measurement.

20. The method of claim 15 further comprising the step of inhibiting said charging current from flowing to said battery when the battery voltage is at or above a second predetermined voltage above said regulating voltage.

21. The controller of claim 4 wherein said array exhibits an inherent transition time in switching between an interrupted charging current mode to a passage of charging current mode under the control of said switching means, and wherein said switching means comprises means for transitioning between interrupting and passing said charging current with a rise time selected to substantially match said inherent transition time of said array.

22. The controller of claim 9 wherein $V_r$ is approximately 14.1 volts, and wherein said equalization means comprises means for establishing said equalization voltage at less than 15 volts.

23. The controller of claim 22 wherein said equalization voltage is established at approximately 14.35 volts.

24. The controller of claim 8 wherein said means for interrupting includes at least two field effect transistors connected to each other in back-to-back relation for interrupting said charging current path in response to the voltage across said array being at or below said predetermined low voltage.

25. The controller of claim 1 further comprising protection means for automatically protecting the controller and load against damage from abnormal operation.

26. The controller of claim 25 wherein said protection means comprises means responsive to detection of a short circuit across said load for automatically disconnecting said load from said battery.

27. The controller of claim 25 wherein said protection means comprises means responsive to an open circuit condition across said battery for disconnecting said load from said array.

28. The controller of claim 25 wherein said protection means comprises:
  means for sensing temperature at said controller;
  means for automatically opening said switching means to interrupt said charging current in response to the sensed temperature reaching a first high temperature; and
  means for automatically disconnecting said load from said controller in response to the second temperature reaching a second high temperature above said first high temperature.

29. The controller of claim 28 further comprising means for automatically reconnecting said load to said controller, and for restoring said charging current, in response to the sensed temperature falling to a normal temperature below said first and second high temperatures.

30. The method of claim 15 further comprising the step of sensing the battery voltage to control steps (a), (b) and (c), wherein:

in response to said duty cycle being at or above a predetermined duty cycle, battery voltage is sensed during said charging current pulses; and in response to said duty cycle being below said predetermined duty cycle, battery voltage is sensed between said charging current pulses.

31. The method of claim 15 further comprising the steps of:

sensing the temperature at said battery; and automatically changing said regulation voltage as a function of the sensed temperature.

32. The method of claim 15 further comprising the steps of:

sensing the ambient temperature; and automatically changing said regulation voltage as a function of the sensed temperature.

33. The method of claim 15 further comprising the steps of:

indicating whether said battery is a sealed battery or a flooded battery; and adjusting said regulation voltage as a function of whether the battery is sealed or flooded.

* * * * *